United States Patent
Tsiberidis

(10) Patent No.: US 8,701,844 B2
(45) Date of Patent: Apr. 22, 2014

(54) BRAKE DUST COLLECTING DEVICE

(75) Inventor: Konstantinos Tsiberidis, Heilbronn (DE)

(73) Assignee: KT Projektentwicklungs-GmbH, Heilbronn (DE)

( * ) Notice: Subject to any disclaimer, the term of this patent is extended or adjusted under 35 U.S.C. 154(b) by 1103 days.

(21) Appl. No.: 12/513,213

(22) PCT Filed: Nov. 5, 2007

(86) PCT No.: PCT/EP2007/009572
§ 371 (c)(1),
(2), (4) Date: Aug. 14, 2009

(87) PCT Pub. No.: WO2008/052805
PCT Pub. Date: May 8, 2008

(65) Prior Publication Data
US 2010/0065387 A1 Mar. 18, 2010

(30) Foreign Application Priority Data
Nov. 3, 2006 (DE) .......................... 10 2006 051 972

(51) Int. Cl.
*F16D 65/00* (2006.01)
(52) U.S. Cl.
USPC .................................. 188/218 A; 188/264 AA
(58) Field of Classification Search
USPC ........... 188/218 A, 264 A, 264 AA; 55/385.3
See application file for complete search history.

(56) References Cited

U.S. PATENT DOCUMENTS

| 5,035,304 | A | | 7/1991 | Boesch |
|---|---|---|---|---|
| 5,121,972 | A | * | 6/1992 | Glover ........................... 301/6.3 |
| 5,162,053 | A | * | 11/1992 | Kowalski, Jr. ............... 55/385.3 |
| 6,592,642 | B2 | * | 7/2003 | Maricq et al. ................ 55/385.3 |
| 7,111,710 | B2 | * | 9/2006 | O'Rourke ............... 188/218 XL |
| 8,025,132 | B2 | * | 9/2011 | Krantz ....................... 188/218 A |
| 8,191,691 | B2 | * | 6/2012 | Gelb ....................... 188/264 AA |

FOREIGN PATENT DOCUMENTS

| CH | 687013 A5 | 8/1996 |
|---|---|---|
| DE | 2653607 A * | 6/1978 |
| DE | 3934422 A1 | 4/1990 |
| DE | 202005006844 U1 | 7/2005 |
| FR | 2815099 A | 4/2002 |

* cited by examiner

*Primary Examiner* — Bradley King
(74) *Attorney, Agent, or Firm* — Chernoff, Vilhauer, McClung & Stenzel, LLP

(57) ABSTRACT

The invention relates to a brake dust collector (10) for a disc brake (12) comprising a brake disc (18) and a brake caliper (16) clasping the latter. The brake dust collector (10) includes a housing (24) designed to clasp a portion of the brake disc (18) directly adjoining the brake caliper (16) in the main direction of rotation (R) of the brake disc (18). Provided arranged in the housing (24) is a brake dust retainer comprising a plurality of brake dust intake ports. To ensure practically total retainment of the resulting brake dust without detrimenting, indeed, even improving the cooling of the disc brake (12) the housing (24) features a plurality of air intake ports (34; 38) separate from the inner brake dust intake ports, making it possible to direct the inflow of air in the direction of the brake disc (18) and into the inner brake dust intake ports.

19 Claims, 9 Drawing Sheets

BRAKE DUST COLLECTING DEVICE

CROSS-REFERENCE TO RELATED APPLICATIONS

Figure 1:
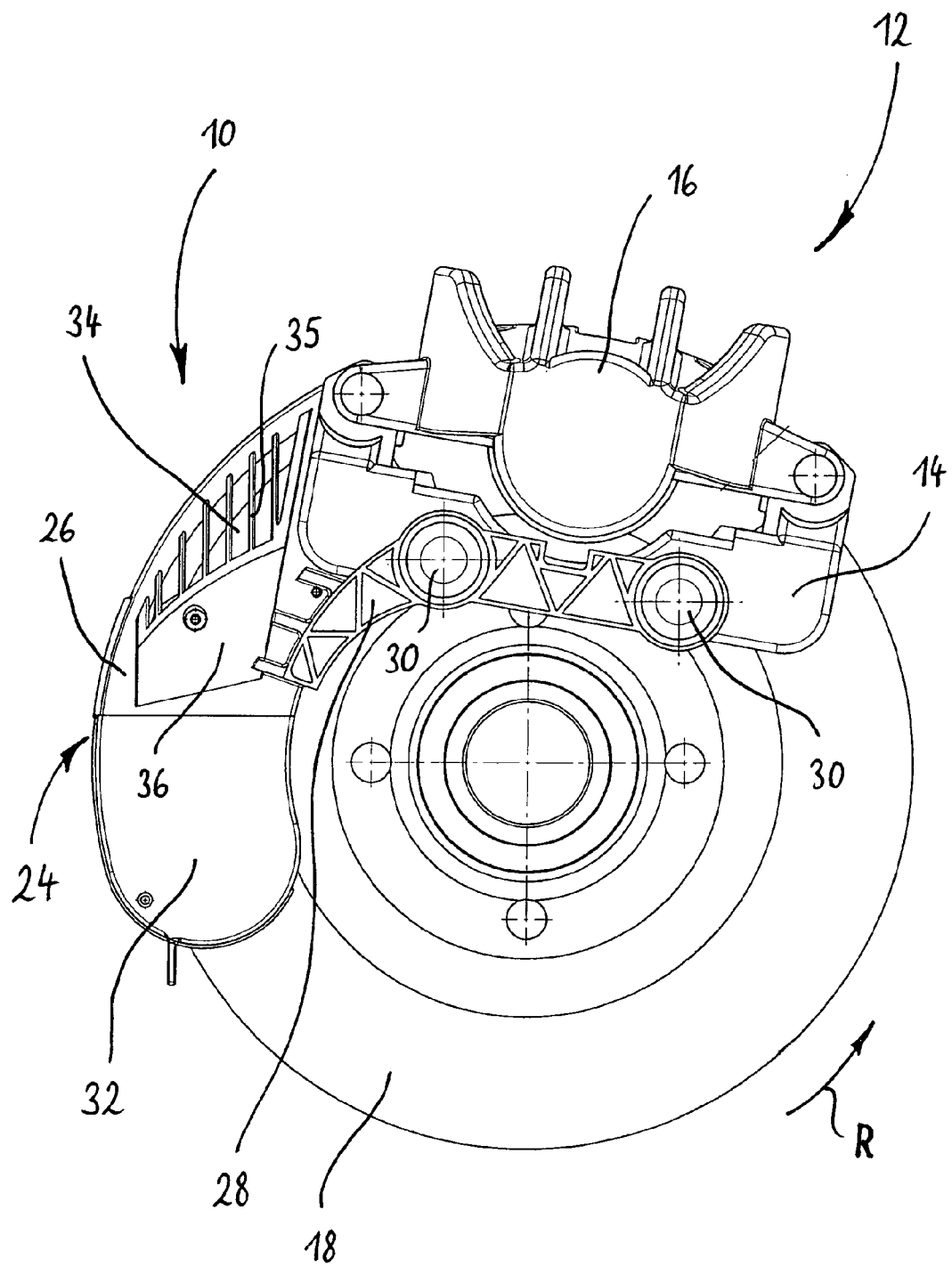

This is a national stage application filed under 35 USC 371 based on International Application No. PCT/EP2007/009572 filed Nov. 5, 2007, and claims priority under 35 USC 119 of German Patent Application No. 10 2006 051 972.8 filed Nov. 3, 2006.

The present invention relates to a brake dust collector for a disc brake, particularly for a motor vehicle disc brake, said disc brake comprising a brake disc and a brake caliper clasping the latter, the brake dust collector including a housing designed to clasp a portion of the brake disc directly adjoining the brake caliper in the main direction of rotation of the brake disc and provided arranged in the housing with a brake dust retainer comprising a plurality of brake dust intake ports. One such brake dust collector is known from German patent DE 39 34 422 A1.

With brakes functioning by the friction principle, attrition debris materializes during the braking action, mainly involving the material of the friction pads becoming successively worn off during braking. Since disc brakes have an open design the attrition debris does not remain captive in the brake, it instead becoming distributed more or less far due to the slip stream of the vehicle on the move and due to other influencing factors of the weather such as e.g. rain. This attrition debris, also termed brake dust, becomes deposited especially in the direct vicinity of a disc brake, i.e. in the case of a motor vehicle, mainly on the rim of the wheel. Since the brake dust is brown to black in colour its soilage of the wheel rim is unsightly. In addition to this, if the deposits of brake dust are not removed at regular intervals, the brake dust can become engrained in the material of the wheel rim, ruining the surface thereof. However, exhausting the brake dust into the environment is also prohibitive because as fine dust it constitutes a health hazard. On top of this the constituents involved in friction pad materials, again contained in the brake dust, are partly injurious.

To counter the nuisance of brake dust deposits a variety of approaches to solve the problem exist. Thus the German utility model 79 31 520 cites in conjunction with a vehicle disc brake a brake dust shield covering the brake disc at the rim side also in the region of the disc brake and which is secured to the wheel hub mount and/or the disc brake whilst comprising at the inner side of the wheel a brake dust exhaust oriented radially outwards. A similar approach in the form of a ring-shaped insertion plate located between the rim of a wheel and the brake disc of disc brake reads from the European patent EP 0 204 433. However, these approaches fail to prevent emission of the brake dust as such, but merely deposition thereof at certain locations of the vehicle wheel.

Known from German patent DE 42 40 873 C2 is a brake dust retainer for motor vehicles which generates a vacuum by means of a suction blower to draw off the brake dust where it originates. The vacuumed brake dust is captured in a filter unit adjoining the suction blower. A similar brake dust retainer is known from German patent DE 196 43 869 A1 which likewise draws off the resulting brake dust by means of a suction device and transfers the dust into an accumulator. Another brake dust collector is known from European patent EP 1 256 239. The device described therein makes use of plates located near to where the brake dust materializes and which are electrostatically charged or in which an electromagnetic field is generated to attract and trap the resulting brake dust. The brake dust retained in this way is removed at regular intervals from the plates and transferred into an accumulator.

Known from German patent DE 198 46 887 C2 is a motor vehicle braking system in which each friction pad features dust passageways in the form of grooves leading to a recess in the friction pad for collecting the brake dust or alternatively to a dust collector container.

Known from German patent DE 103 36 984 A1 is a disc brake comprising a brake dust retainer featuring a plurality of wipers covering the free area between the backplate and the rotating brake disc at least in part whilst, on the one hand, being fixedly secured to the backplate and, on the other, contacting the brake disc at least punctiform. Depending on the embodiment concerned the wipers serve either to merely to extract the (heat) energy from the brake dust to prevent the rim being scorched, or they are designed to trap the resulting brake dust for instance between the individual fibers of the wipers to prevent it from being further disseminated. The wipers then need to be cleaned from time to time, e.g. when the friction pads are changed. Similarly configured is the disc brake as it reads from the generic German patent DE 39 34 422 A1 in which the resulting brake dust is directed through a flow guide lattice arranged adjoining the brake disc into a filter located radially relative to the axis of rotation of the brake disc and axially outside of the flow guide lattice, the filter retaining the brake dust.

All of the devices as aforementioned fail to offer a total solution to the problem of brake dust. All some of the devices described do, is to prevent brake dust being deposited on the rim but not emission of the resulting brake dust to the environment. Although other devices as described retain the brake dust near to where it originates, they create a cooling problem for the brake because of the relatively large clasped portion of the brake disc, whilst other devices as described are complicated by including a suction blower and corresponding suction lines.

The invention is based on the object of defining a now total solution to the problem of brake dust. Starting with the generic brake dust collector as claimed in claim 1, this object is achieved in accordance with the invention by the housing now featuring a plurality of air intake ports separate from the brake dust intake ports of the brake dust collector. Physically separating the air intake ports arranged external on the housing of the brake dust collector from the brake dust intake ports arranged in the housing now makes it possible to direct the resulting brake dust into the brake dust retainer of the brake dust collector without the need of a suction blower or other auxiliary means requiring an external power supply whilst, in addition, making use of the air inflowing through the air intake ports into the brake dust collector to cool the rotating brake disc. Now, although the brake dust collector in accordance with the invention clasps a portion of the brake disc comparitive tests showed that the increase in temperature of the brake disc featuring the brake dust collector in accordance with the invention is even less than with the same disc brake having no brake dust collector under the given conditions.

Preferably the housing of the brake dust collector is provided on both sides of the brake disc with at least one air intake port arranged upstream of the brake dust intake ports as viewed in the main direction of rotation of the brake disc. This now makes it possible to easily give the air streaming through the air intake port the wanted direction to the brake disc and to the brake dust intake ports. Preferably, the air intake ports arranged on both sides of the brake disc, i.e. sideways at the housing of the brake dust collector are finned to prevent the ingress of debris such as e.g. grit into the brake dust collector. Furthermore, the fins clasping the air intake ports preferably extend somewhat into the brake dust collector, forming between them air intake passageways, the flow cross sections of which is reduced, in other words tapered inwards in the direction of flow, practically totally preventing brake dust vortexed in the brake dust collector from emission through the air intake ports to the environment.

In other preferred embodiments of the brake dust collector in accordance with the invention the housing features at least one air intake port radially external to the brake disc. Such an air intake port also makes it possible to direct the intake air so well that it flows to the brake disc and to the brake dust intake ports. Preferably both the air intake ports on the side as well as one or more radially arranged air intake ports are provided.

To further improve the air flow in the housing of the brake dust collector preferred embodiments feature air outlet ports arranged separate from the air intake ports. These air outlet ports preferably feature filters which retain the brake dust but allow air and water to pass, thus making it possible to drain off any water having gained access to the brake dust collector without any problem.

To trap the brake dust materializing in operation of the brake the brake dust retainer is preferably provided with one or more brake dust collection chambers. So that the resulting brake dust gaining access to the brake dust retainer through the brake dust intake ports is first deposited in this brake dust collection chamber the brake dust retainer features on both sides of the brake disc at least one slat extended radially relative to the brake disc and along the circumference of the brake disc, beginning at an assigned brake dust intake port and ending in the brake dust collection chamber. In some embodiments a plurality of slats is provided each extending from an assigned brake dust intake port into the brake dust collection chamber. The slat(s) define between each other, or between the one slat and the housing, passageways for directing the brake disc into the brake dust collection chamber, in which the flow velocity is increased so that the brake dust entering the passageways through the brake dust intake ports arranged at the start of the passageways is entrained and not becoming deposited in the passageway. In spec preferred embodiments the cross-section of the one or each brake dust intake port is greater than the porting cross-section at the end of each slat. This results in the flow cross sections of the said passageways for directing the brake dust into the brake dust collection chamber being preferably continually reduced from the start of the passageway to its end in correspondingly increasing the flow velocity in the passageway. After discharge of the air flow charged with the resulting brake dust from the passageways into the brake dust collection chamber, the flow velocity collapses and the entrained brake dust particles drop from the air flow to become deposited in the brake dust collection chamber, whilst the air exits the brake dust collection chamber preferably through the air outlet ports. The individual slats and thus the passageways defined thereby may extend substantially linearly juxtaposed. In one preferred embodiment, however, each slat extends along the the circumference of the brake disc firstly in the main direction of rotation, before extending radially inwards and finally contrary to the main direction of rotation. Shaping the slats and passageways can be optimally streamlined so that the resulting brake disc is practically totally entrained through the passageways in subsequently achieving a near total and uniform deposition of the entrained brake disc in the brake dust collection chamber.

In preferred embodiments of the brake dust collector in accordance with the invention the housing is configured split to comprise a first housing part for mounting the brake dust collector on the disc brake, particularly on its backplate as well as a second housing part releasably secured to the first housing part. Preferably in this arrangement the air intake ports arranged on both sides of the brake disc are configured on the first housing part, whereas the brake dust collection chamber(s) is/are provided in the second housing part which, in this way, can now be simply removed during maintenance for emptying the brake dust collection chamber(s) contained therein.

To monitor how much brake dust has accumulated in the brake dust collection chamber preferred embodiments of the brake dust collector feature a level sensor. The level sensor may be of the mechanical, electromechanical, or optical type as known to persons skilled in the art of level sensors. Such a level sensor may be circuited so that the driver of the motor vehicle equipped with brake dust collectors in accordance with the invention is alerted, for instance by a warning light that the brake dust collection chamber is in need of being emptied. Emptying can be done, as described above, by removing the brake dust collection chamber and emptying the brake dust manually, or the brake dust collection chamber may feature a dump valve for connecting a suitable vacuumm dumper, for example, to transfer the brake dust having collected in the brake dust collection chamber into the dumper.

So that this thus practically totally collects all dust having resulted from braking in preventing emission to the environment, preferred embodiments of the brake dust collector in accordance with the invention are provided on both sides of the brake disc with at least one wiper designed to come into contact with the corresponding sides of the brake disc. Each wiper is designed to function to advantage by being located upstream of the brake dust intake ports of the brake dust retainer in the air flow entraining the brake dust so that the brake dust can be swept into the brake dust intake ports and thus into the brake dust collection chamber. These wipers may be configured for example as brushes or also as lips, the contact of which with the brake disc may be linear or configured as a plurality of punctiform points of contact or otherwise. All that is important in this context is that the brake dust sticking to the brake disc is reliably removed without the contact between the wipers and the brake disc resulting in any significant wear of the brake disc.

In advantageous embodiments of the brake dust collector the wipers are movably mounted axially (relative to the axis of rotation of the brake disc), they not having any axially motion relative to the brake disc in coming into contact therewith until the brake is activated. It is in this way that a continual increase in the friction resistance is avoided whilst considerably contributing towards a reduction in the wear of the wipers. Where a hydraulic disc brake is involved, for instance, the axial motion of the wipers relative to the brake disc may be done hydraulically by the wipers being assigned pistons which on activation of the brake receive part of the effective hydraulic pressure, urging the wipers into contact with the rotating brake disc. As an alternative the wipers may be biased, for example, spring-loaded in the direction of the brake disc, in one preferred embodiment a st being provided against which the spring-loaded wiper is urged and which on actuation of the brake is retracted or otherwise removed so that the spring-load can urge the wiper against the brake disc. In one variant with wipers biased spring-loaded in the direction of the brake disc the retraction ou wipers to their starting position after termination of the braking action is done hydraulically. But, in any case, i.e. irrespective of how the wipers are moved to and back from the brake disc, the wipers are retracted after braking action preferably with a certain time delay so that brake dust generated by the braking action is collected practically totally.

The housing of the brake dust collector in accordance with the invention may be made of any material suitable for the application, as long as the housing is resistant to high temperatures, for disc brakes can attain very hgh temperatures in operation. In addition to this, the housing needs to be lightweight so that the unsprung masses of the suspension of the motor vehicle are not unduly increased. The housing may be cast in aluminium or also injection molded, where necessary employing glass fiber reinforced plastics.

Figure 2:
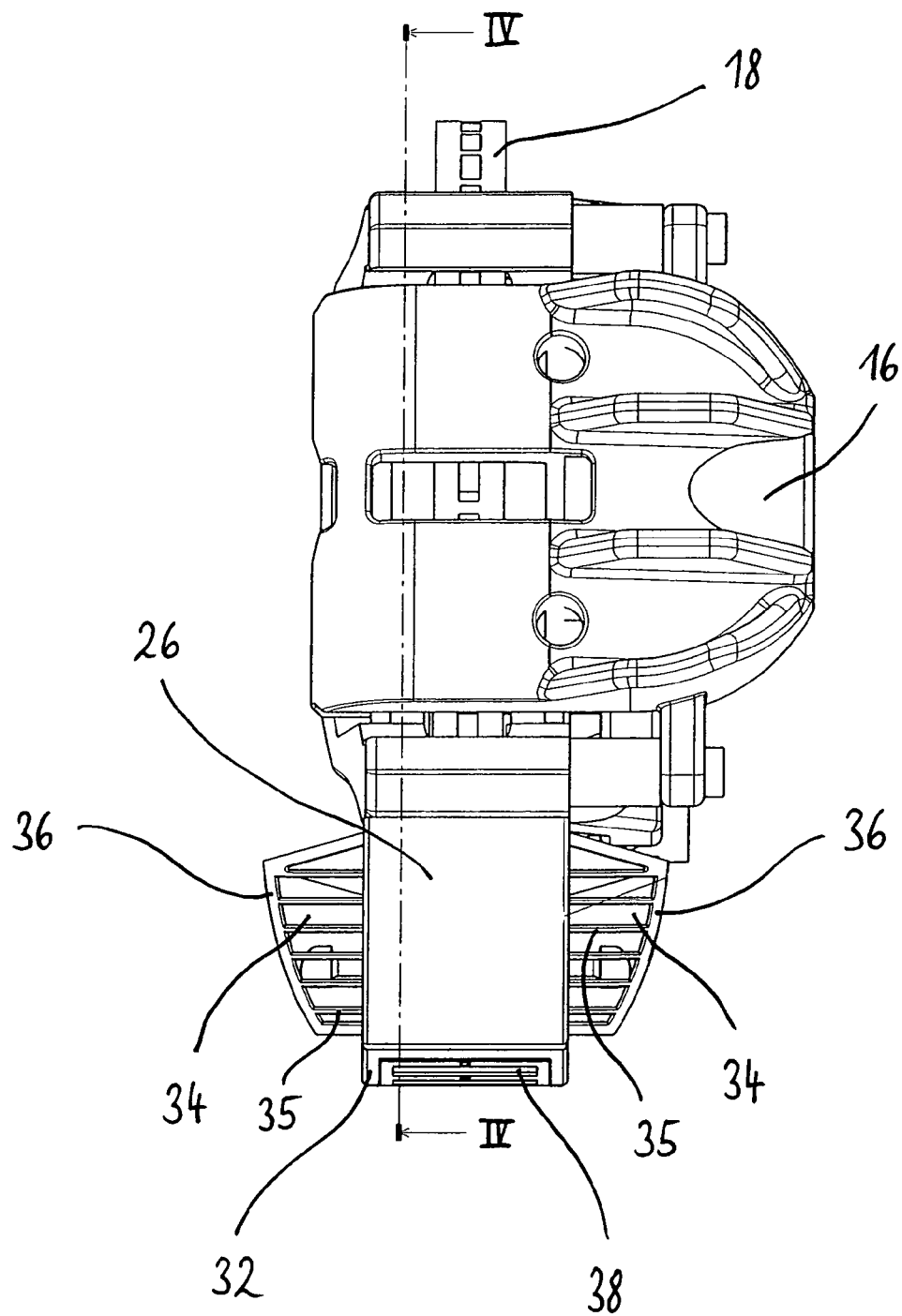
Figure 3:
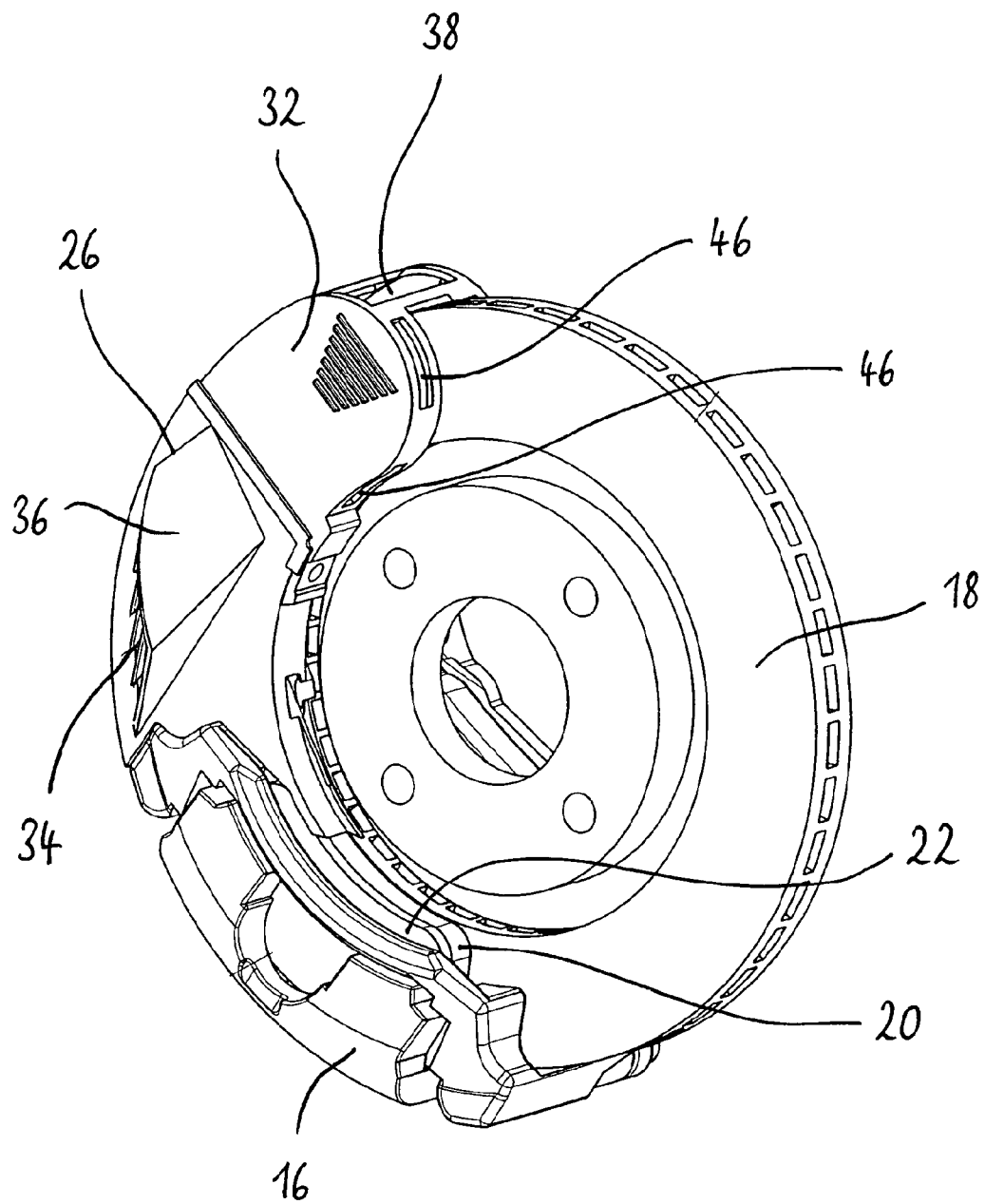
Figure 4:
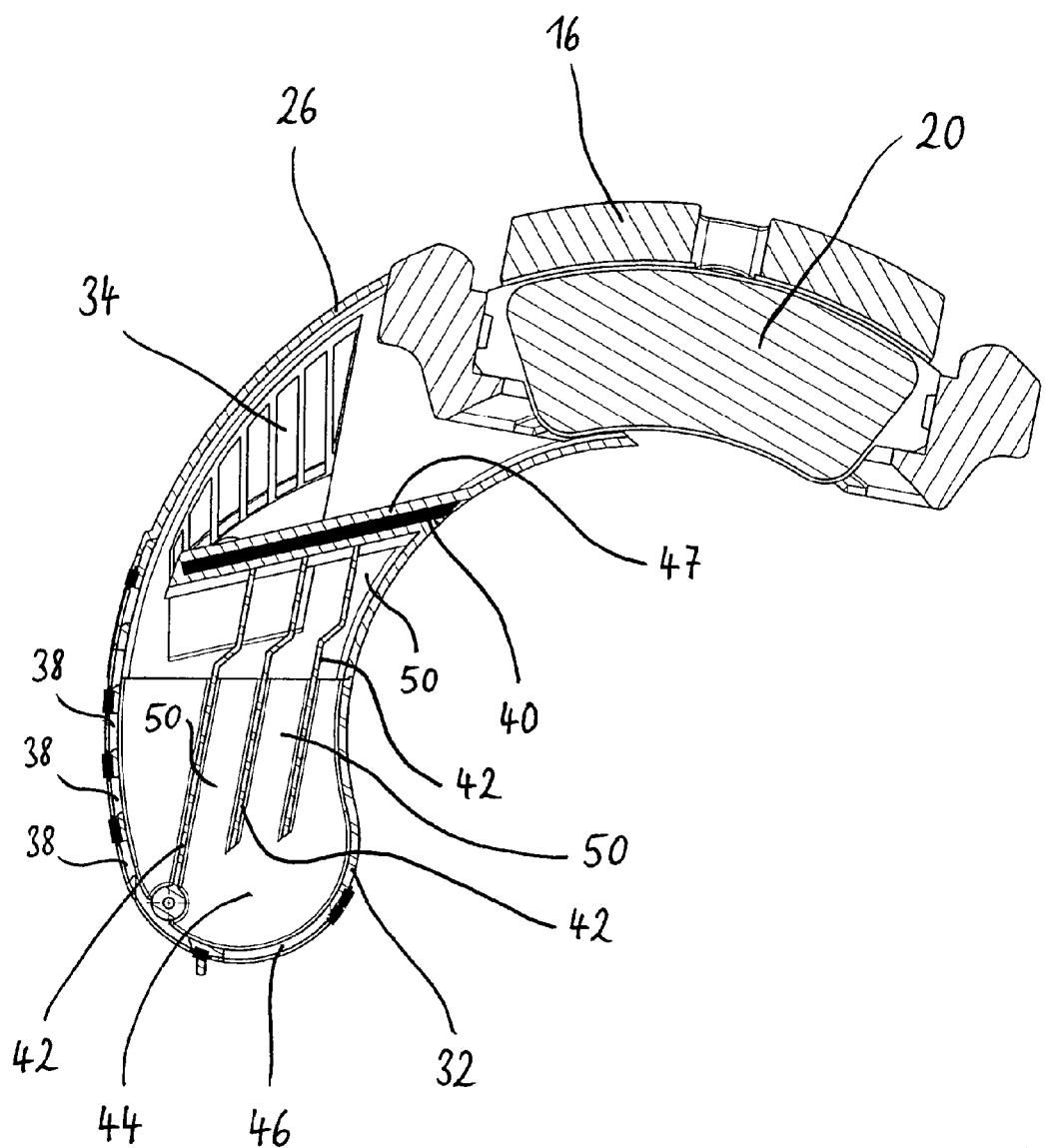
Figure 5:
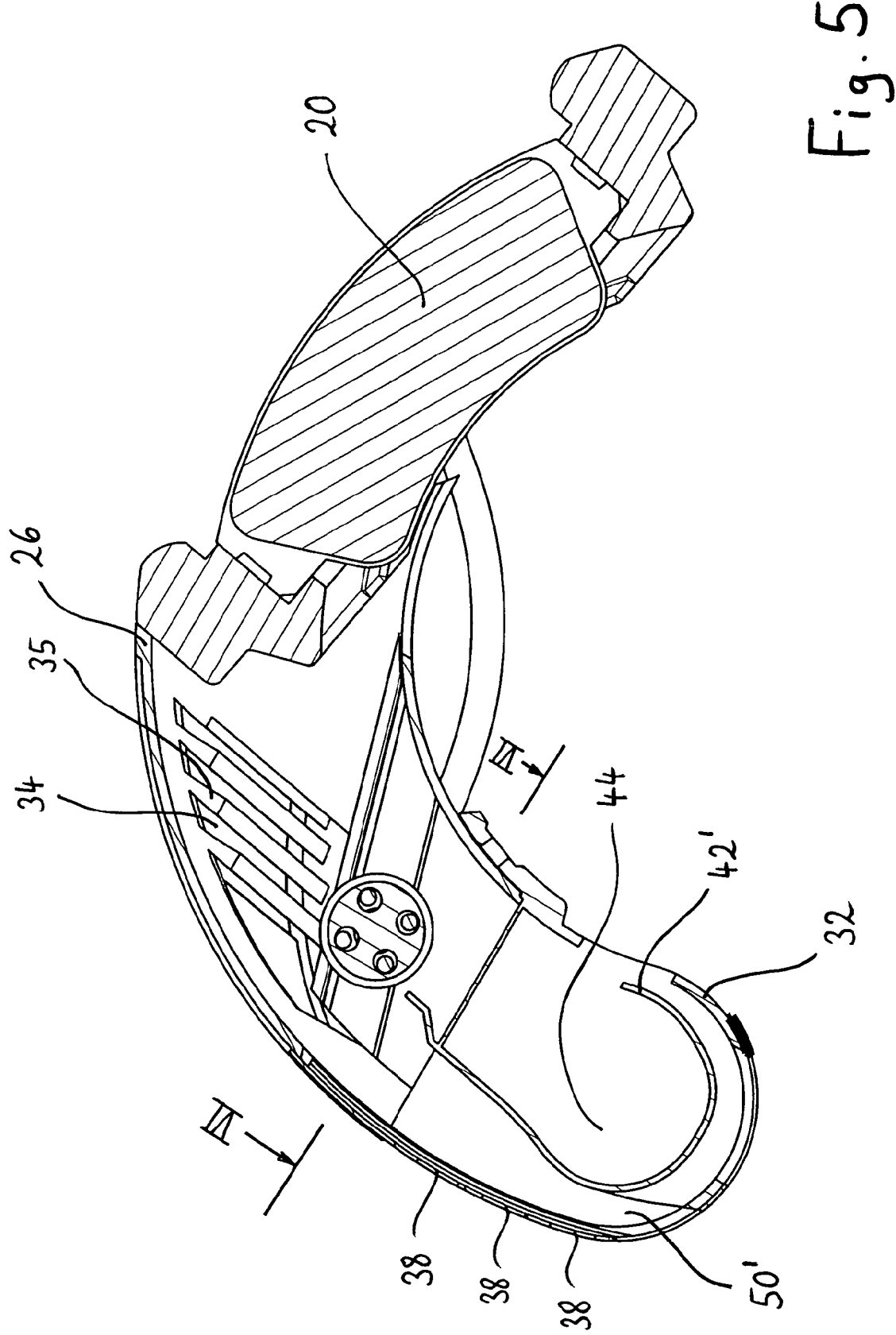
Figure 6A:
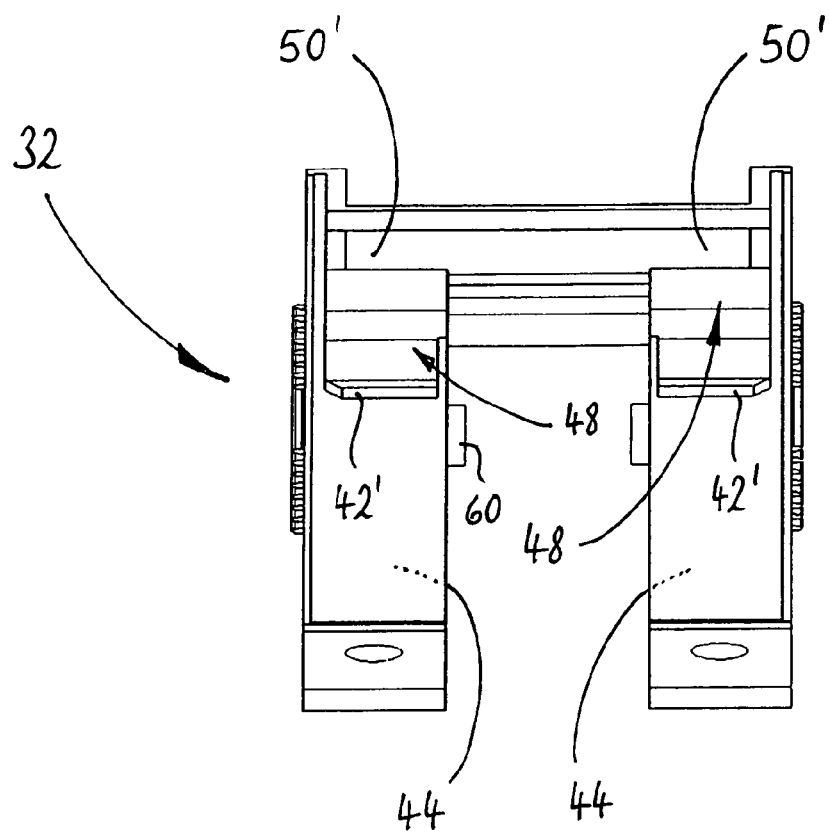
Figure 6B:
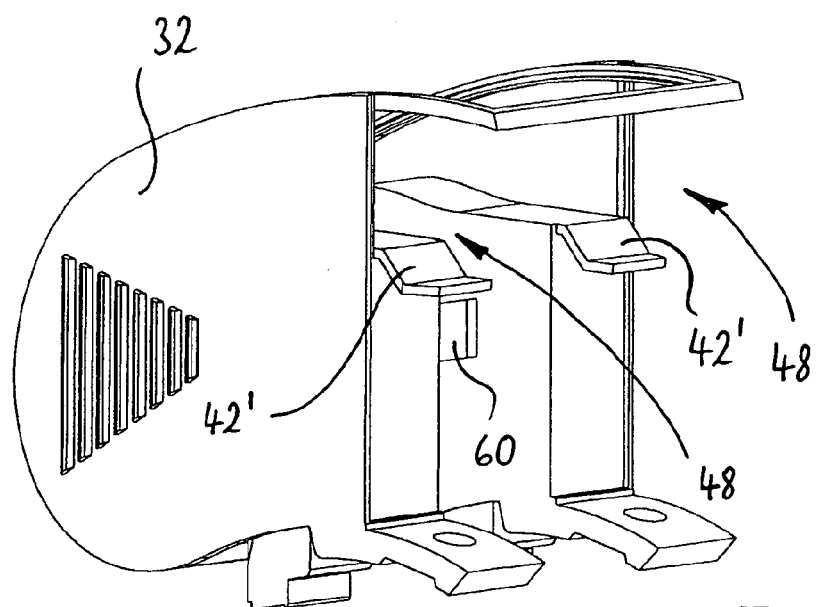
Figure 7:
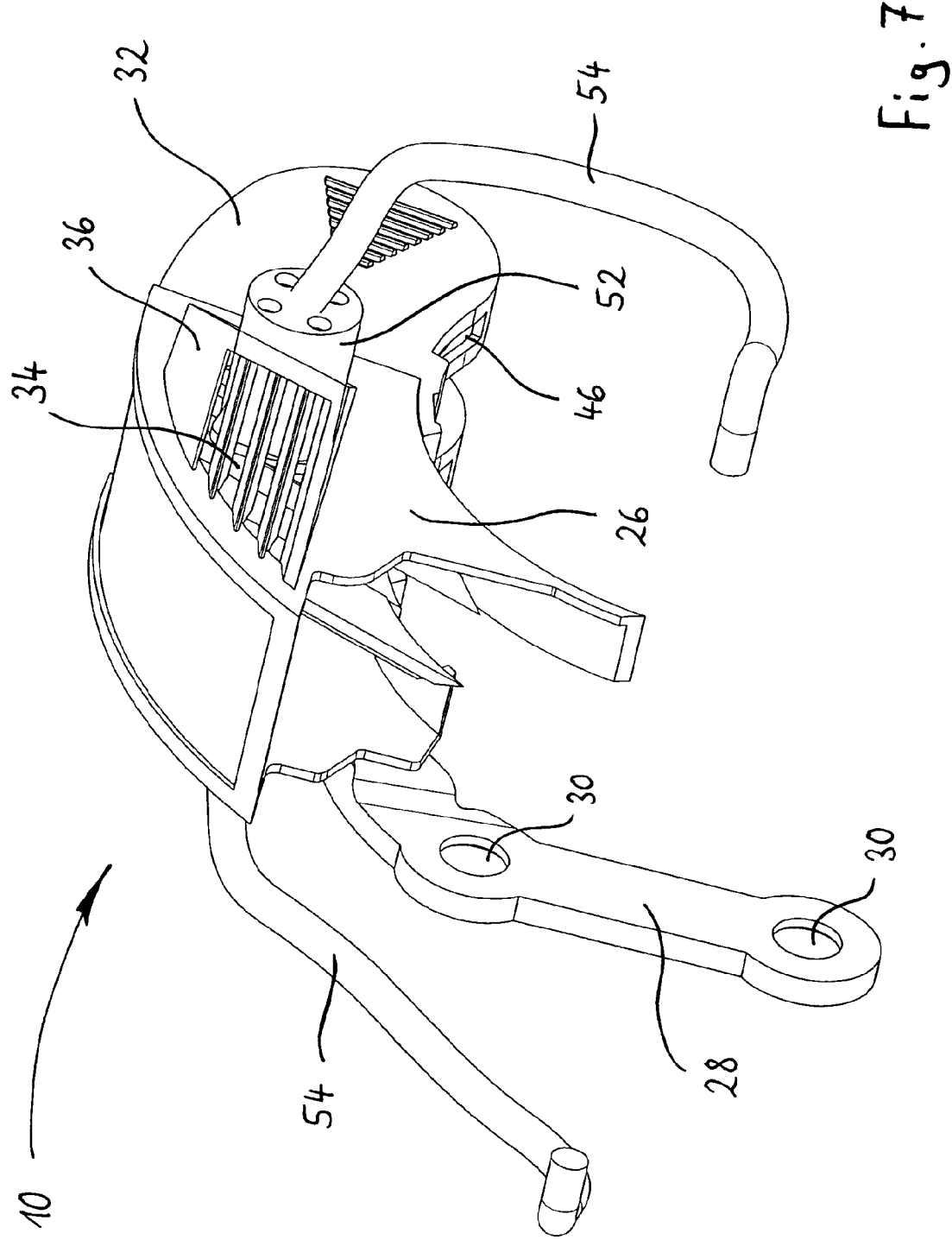
Figure 8:
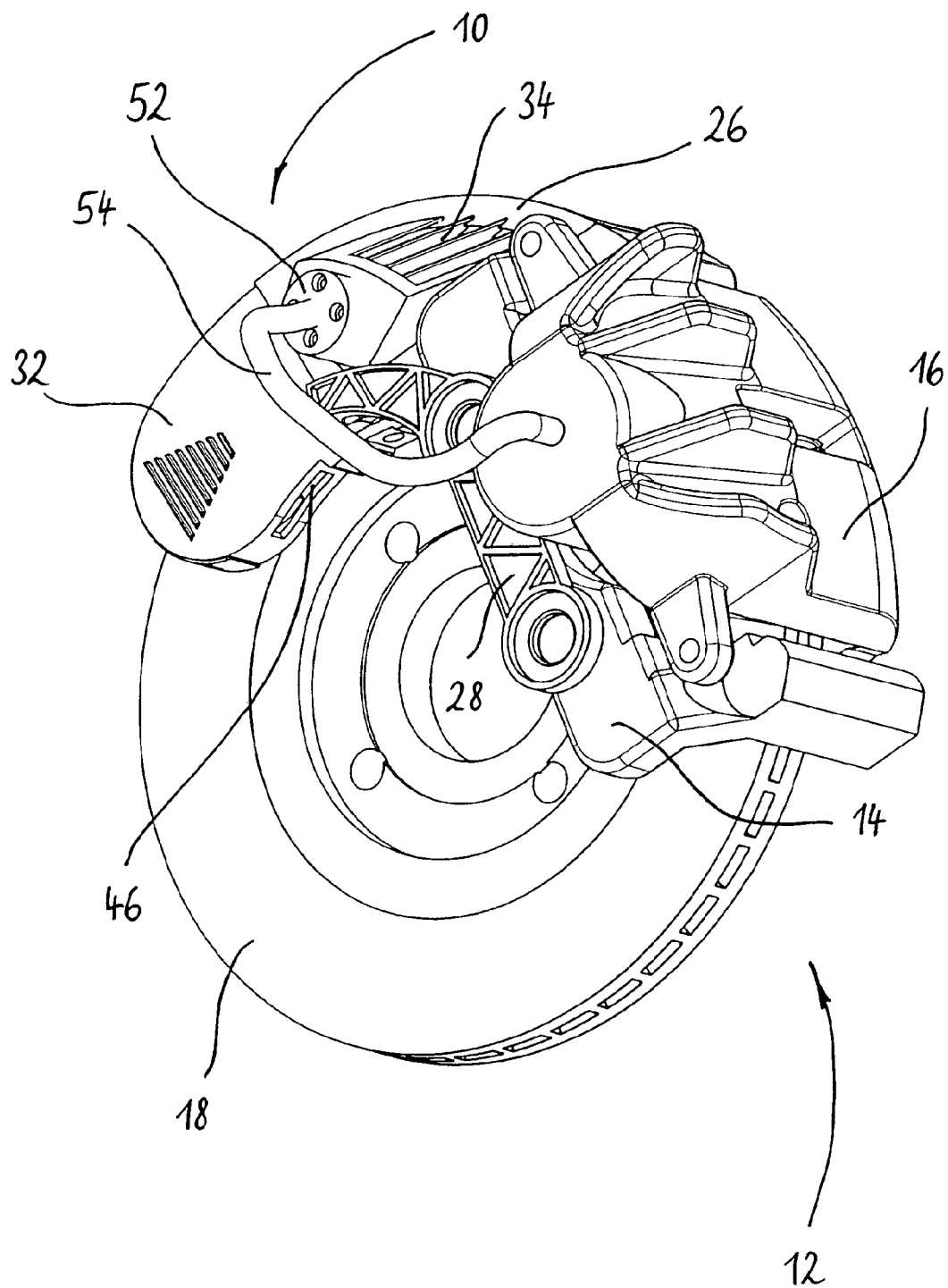
Figure 9:
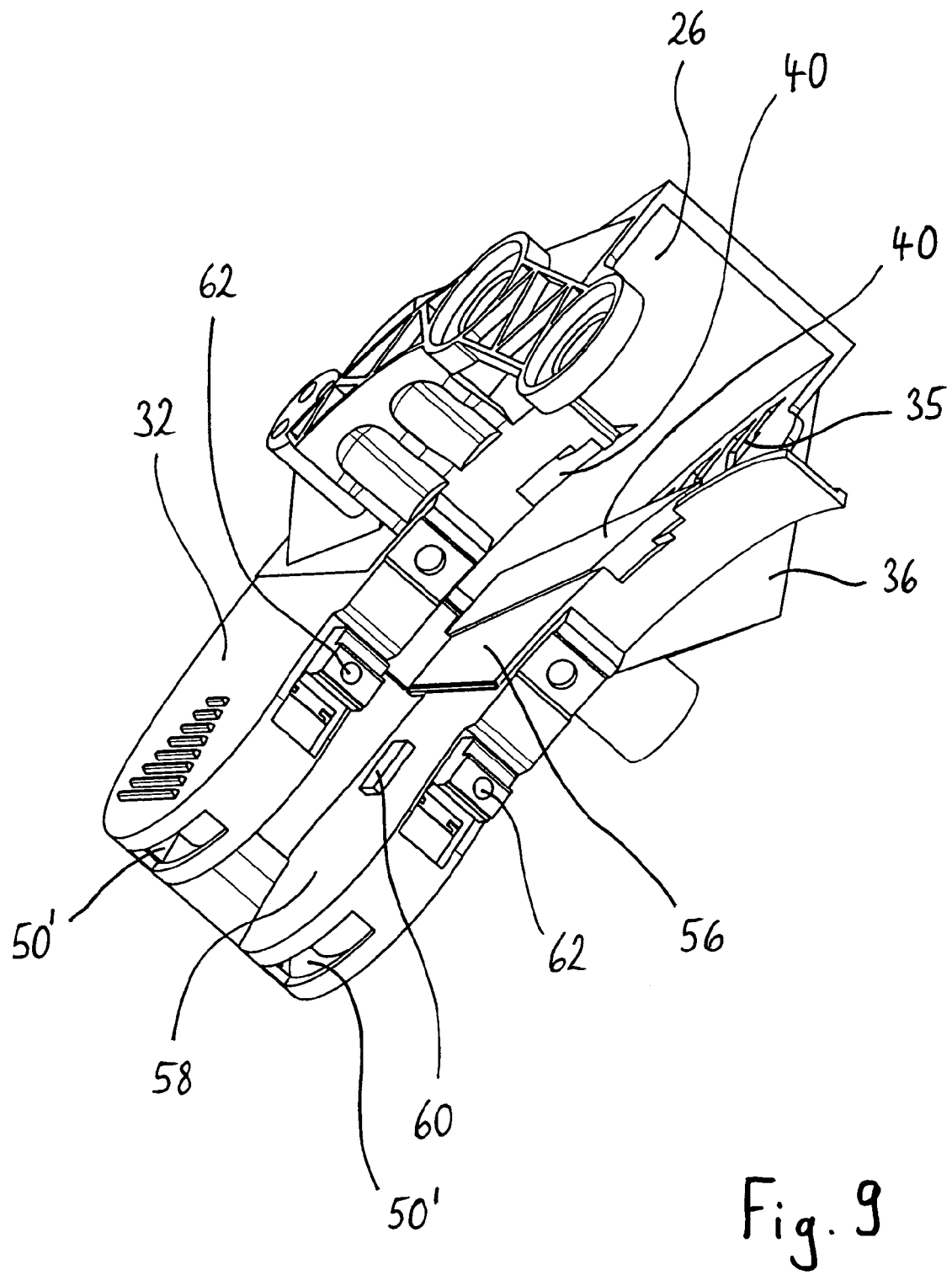

The brake dust collector in accordance with the invention is rugged and reliable in operation, for which it requires no auxiliary power supply and can be fitted both to new vehicles in manufacture as well as retrofitted to existing vehicles. Preferred example embodiments of a brake dust collector in accordance with the invention will now be detailed with reference to the diagrammatic drawings in which:

FIG. 1 is a side view of a motor vehicle disc brake mounting a brake dust collector in accordance with a first embodiment of the invention, FIG. 2 is a top-down view of the disc brake and brake dust collector as shown in FIG. 1, FIG. 3 is a bottom up angled view of the disc brake and brake dust collector as shown in FIG. 1, FIG. 4 is a section IV-IV through FIG. 2, FIG. 5 is a view corresponding to that of FIG. 4 showing a second example embodiment of the brake dust collector, FIG. 6A is a section VI-VI through FIG. 5, FIG. 6B is a front angled three-dimensional view of the second housing part of the brake dust collector as shown in FIG. 6A, FIG. 7 is a three-dimensional view of the second example embodiment, FIG. 8 is a three-dimensional view of the brake dust collector as shown in FIG. 7 fitted to a motor vehicle disc brake, and FIG. 9 is a bottom up three-dimensional view of the brake dust collector as shown in FIG. 7.

Referring now to FIGS. 1 to 3 there is illustrated a first example embodiment of a brake dust collector identified in general by the reference numeral 10 as fitted to a motor vehicle disc brake 12.

The disc brake 12 in the example as shown is a typical floating caliper disc brake with a backplate 14 serving to secure the brake to the suspension (not shown) of the motor vehicle and a brake caliper 16 moving floated relative to the backplate 14 and clasping a brake disc 18. The disc brake 12 is for instance hydraulically actuated to urge friction pads on both sides of the brake disc 18 against the latter to brake rotation of a wheel (not shown) connected to the brake disc 18. In FIG. 3 one of the friction pads, namely friction pad 20 actuated by the brake caliper 16 is clearly evident showing its pad mount 22. A further identical friction pad is provided opposite on the other side of the brake disc 18 and is actuated directly by a brake piston (not shown) of the disc brake 12. The design configuration and function of such disc brakes is well known to any person skilled in the art of vehicle brakes and thus no further details need to be described. But it is to be noted that the brake dust collector 10 in this context is explained simply by way of a hydraulically actuated motor vehicle disc brake. But it could just as well involve a disc brake which is pneumatically actuated or electromechanically (with or without self-boosting) etc.

When in a braking action the friction pads of a disc brake are urged against the brake disc, wear occurs at the friction pads and, to a much lesser degree, at the brake disc, i.e. both the friction pad material as well as the material of the brake disc is worn off somewhat. The resulting attrition debris is particulate and is generally termed brake dust. In the vast majority of all motor vehicles in operation nowadays this brake dust is distributed to adjoining parts of the vehicle, particularly to the wheels, as well as into the air slipstreaming the brake and is thus emitted to the environment. To prevent this happening as best possible the brake dust collector 10 as shown in the FIGs. is connected to the disc brake 12.

As is evident from the FIGs. the brake dust collector 10 directly connects the brake caliper 16 of the disc brake 12 so that no brake dust can exit between the brake dust collector 10 and the brake caliper 16. Where necessary a seal (not shown) may be sandwiched between the brake dust collector 10 and the brake caliper 16, but adequate sealing of this area may also be attained, for instance, by the components overlapping somewhat.

The brake dust collector 10 has a housing 24 which in the side view has generally the shape of a circular ring segment which for clasping the brake disc 18 in the main direction of rotation R is configured directly at the portion of the brake disc adjoining the brake caliper 16. The main direction of rotation R in this context means the direction of rotation of the brake disc 18 in which it predominantly rotates in operation and thus the direction of rotation in forward travel of the vehicle where a vehicle disc brake is concerned.

Referring now to FIG. 3 there is illustrated how the housing 24 has a U-shaped cross-section, it comprising in the example embodiment as shown two housing parts 26 and 28. A first housing part 26 serves to make the connection to the brake caliper 16 and is provided with an arm 28 (see FIG. 1) for securing the housing 24 to the backplate 14. The free end of the arm 28 features for this purpose two bolting holes 30 through which bolts (not shown) extend for bolting the backplate 14 to the vehicle suspension (also not shown). The second housing part 32 is releasably connected to the first housing part 26, for example, by snap or ratchet action connectors (likewise not shown).

Provided on each side of the housing 24 is an air intake port 34 flared outwards, whose air intake cross-section is shielded by fins 35 to prevent the ingress of coarse attrition debris. In the example embodiment as shown these side air intake ports 34 are configured at the first housing part 26 of the housing 24 of the brake dust collector 10. Funnel-shaped recesses 36 in the first housing part 26 are arranged and configured so that the air inflowing through the air intake ports 34 is directed into the housing 24 and in the direction of the brake disc 18 to cool it in operation.

Referring now to FIG. 2 there is illustrated how in addition a further air intake port 38 is provided at the facing outer surface of the housing 24, the air intake cross-section of which is likewise finned for likewise streaming the air into the housing 24 and to the brake disc 18. In the example embodiment as shown in FIGS. 1 to 4 this radial air intake port 38 is configured in the second housing part 32, but it may just as well extend into the first housing part 26 in modified example embodiments or be provided only in the first housing part 26.

Referring now to FIG. 4 there is illustrated how there is provided in the interior of the housing 24 of the brake dust collector 10 a brake dust retainer featuring on both sides of the brake disc 18 wipers 40, flow director slat 42, brake dust collection chamber 44 and air outlet ports 46.

In the example embodiment as shown, the wipers 40 take the form of strips mounted axially movable relative to the brake disc 18 in 47 configured in the interior of the first housing part 26. These wipers 40 are provided to contact the brake disc 18 by their facing surface to remove brake dust sticking to the surface of the brake disc. For this purpose the backplate 14 may be biased spring-loaded against the surface of the brake disc, but may just as well be brought into contact with the brake disc 18 by a braking action as is described later on.

The side of each wipers 40 come into contact with the surface of the brake disc may take the form of a brush, for example, cobalt brushes having proved to be particularly well suited for this purpose. But, as an alternative a cli may be provided which wipes the brake dust from the surface of the brake disc. Other variants are likewise available to the person skilled in the art as long as the wipers 40 are adequately resistant to high temperatures and feature a favorable wear response both as regards the wipers 40 themselves and as regards the brake disc 18 coming into contact therewith at least temporarily.

Referring now to FIG. 4 again there is illustrated how the wipers 40 are arranged slanting, i.e. firstly contacting a given portion of the brake disc 18 by their radial inner end before successively coming into contact with parts thereof located radially further outwards. This results in brake dust sticking to the brake disc 18 being removed from the inside out whilst centrifugal force drives removed brake dust radially outwards into the air stream entering through the side air intake ports 34. Furthermore, in operation of the disc brake 12 any attrition debris materializing at the friction pad 20 and at the opposite friction pad (not shown) is likewise entrained by the rotating brake disc 18 and directed into the air stream entering tangentially through the side air intake ports 34.

Referring now to FIGS. 6A and 6B there is illustrated how the air stream charged in such a way with brake dust then enters through the brake dust intake ports 48 into passageways 50 defined between the individual flow director slat 42 and/or the housing 24. In the example embodiment as shown in FIGS. 1 to 4 three such flow director slats 42 are provided on each side of the brake disc 18, each flow director slat 42 jutting axially away from an inner side surface of the second housing part 32 in the direction of the brake disc 18 and extending substantially in the circumferential direction of the brake disc 18. The free ends of the flow director slats 42 define together with surrounding housing walls the brake dust intake ports 48. Although not illustrated in FIG. 4 the flow cross-section of the passageways 50 is tapered from the brake dust intake ports 48 to their end to boost the flow velocity in each passageways 50 along its extent in thus preventing, as best possible, brake dust being deposited in the passageways 50.

The passageways 50 merge into the brake dust collection chamber 44 where because of the collapse in the flow velocity the entrained brake dust is deposited. The air streaming into the brake dust collection chamber 44 can emerge through the air outlet ports 46 configured at the free face end of the second housing part 32 on each side of the brake disc 18 and shielded by a filter (not shown) made of a material which allows air and water to pass but not brake dust.

Although only one side of the brake dust retainer is evident from FIG. 4 it will be understood that the situation on the other side of the brake disc 18 is just the same, i.e. each side of the brake disc 18 features a wiper 40, the flow director slats 42 and a brake dust collection chamber 44 with its air outlet ports 46. By removing the second housing part 32 in which the brake dust collection chambers 44 are provided, the collected brake dust can be disposed of environmentally conducive or recycled.

Referring now to FIG. 5 there is illustrated a level sensor through a somewhat modified embodiment of a brake dust collector 10 featuring just one flow director slat 42' on each side of the brake disc 18 extending from a brake dust intake ports 48' into the brake dust collection chamber 44, the flow director slat 42' initially extending substantially in the main direction of rotation R of the brake disc 18 before then branching radially inwards to finish by reverting back somewhat against the main direction of rotation R.

Referring now to FIGS. 6A and 6B again there is illustrated clearly how each brake dust intake port 48' arranged at the start of the corresponding passageway 50 and formed by the air intake surface is defined at the bottom by the flow director slat 42', outwards at the sides by the side walls of the second housing part 32 and at the top likewise by the housing part 32. In the example embodiment as shown the inner side definition is formed by an inner wall projection 56 (evident, for example, in FIG. 9) of the first housing part 26 arranged in the main direction of rotation R downstream of the wipers 40. In turn, the passageway 50' defined by the flow director slat 42' comprises a flow cross-section tapered from start to finish. As is better evident from FIG. 5 in this embodiment the fins 35 extend from the air intake ports 34 inwards to become increasingly thicker so that the fins 35 form between them air intake passageways with a tapered flow cross-section, making it difficult for the brake dust to exit from the brake dust collector 10 through the air intake ports 34. The function of this example embodiment corresponds to the function of the example embodiment as described with reference to FIGS. 1 to 4.

Referring now to FIGS. 7 and 8 there are illustrated further details of the second example embodiment of the brake dust collector 10. In a braking action the wiper 40 can be urged against the brake disc 18 hydraulically. For this purpose a hydraulic cylinder 52 is included on the outside of each side of the first housing part 26 in the portion comprising internally a wiper 40 a hydraulic cylinder 52 is fitted in which a hydraulic piston (not shown) reciprocates. Each hydraulic cylinder 52 is connected by means of a hydraulic line 54 to the brake cylinder of the disc brake 12, resulting in a braking action of the disc brake 12 urging the then active hydraulic pressure displacing the hydraulic piston in the hydraulic cylinder 52 in the direction of the brake disc 18 so that the corresponding wiper 40 is moved by the hydraulic piston into contact with the surface of the brake disc. On completion of the braking action the hydraulic pressure collapses such that each wiper 40 either remains in contact with the surface of the brake disc only lightly or a suitable retracting mechanism ensures that the wipers 40 are taken out of contact with the brake disc 18.

Referring now to FIG. 9 there is illustrated the second example embodiment as shown in FIGS. 5 to 8 in a bottom-up view for a better appreciation thereof. Evident is one of the projections 56 as aforementioned of an inner wall of the first housing part 26 defining the brake dust intake ports 48 internally. It is clearly evident from the position of these projections 56 that the brake dust intake ports 48 as viewed in the main direction of rotation R are arranged downstream of the air intake ports 34 and the wipers 40 (in this sequence).

Arranged at the inner walls 58 closing off the brake dust collection chamber 44 to the brake disc (only one of which is evident from FIG. 9) in each case is a protuberance 60 preventing large surface contact of the rotating brake disc 18 with the housing 24 and particularly with the second housing part 32.

In the ports 62 at the underside of the second housing part 32 valves may be arranged for exhausting the brake dust having collected in the brake dust collection chamber 44.

The invention claimed is:

1. A brake dust collector (10) for a disc brake (12) comprising a brake disc (18) and a brake caliper (16) clasping the brake disc, the brake dust collector including a housing (24) designed to clasp a portion of the brake disc (18) directly adjoining the brake caliper (16) in the main direction of rotation (R) of the brake disc (18) and provided with a brake dust retainer arranged in the housing (24), the brake dust retainer comprising a plurality of brake dust intake ports (48), characterized in that the housing (24) features a plurality of air intake ports (34; 38) separate from the brake dust intake ports (48) and in that the brake dust retainer features on each side of the brake disc (18) at least one slat (42, 42') extending radially relative to the brake disc (18) and along the circumference of the brake disc (18), beginning at one of the plurality of brake dust intake ports (48) and ending in a brake dust collection chamber (44).

2. The brake dust collector as set forth in claim 1 characterized in that the housing (24) is provided on both sides of the brake disc (18) with at least one of said plurality of air intake ports (34) arranged upstream of the brake dust intake ports (48) as viewed in the main direction of rotation (R) of the brake disc (18).

3. The brake dust collector as set forth in claim 1, characterized in that the housing (24) features at least one of said plurality of air intake ports (38) radially external to the brake disc (18).

4. The brake dust collector as set forth in claim 1, characterized in that the housing (24) comprises air outlet ports (46) arranged separate from the air intake ports (34; 38).

5. The brake dust collector as set forth in claim 4, characterized in that the air outlet ports (46) feature filters which retain the brake dust but allow air and water to pass.

6. The brake dust collector as set forth in claim 1, characterized in that a plurality of slats (42) is provided, each extending from an assigned one of the brake dust intake ports (48) into the brake dust collection chamber (44), defining between each other passageways (50) for directing the brake dust into the brake dust collection chamber (44).

7. The brake dust collector as set forth in claim 1, characterized in that the cross-section of each brake dust intake port (48) is greater than the porting cross-section at the end of each slat (42, 42').

8. The brake dust collector as set forth in claim 1, characterized in that each slat (42') extends along circumference of the brake disc (18) firstly in the main direction of rotation (R), before extending radially inwards and finally contrary to the main direction of rotation (R).

9. The brake dust collector as set forth in claim 1, characterized in that the housing (24) is configured split to comprise a first housing part (26) for mounting the brake dust collector on the disc brake (12), as well as a second housing part (32) releasably secured to the first housing part (26).

10. The brake dust collector as set forth in claim 9, characterized in that the housing (24) is provided on both sides of the brake disc (18) with at least one air intake port (34) arranged upstream of the brake dust intake ports (48) as viewed in the main direction of rotation (R) of the brake disc (18) and in that the air intake ports (34) arranged on both sides of the brake disc (18) are configured on the first housing part (26).

11. The brake dust collector as set forth claim 1, characterized in that a level sensor monitors the amount of brake dust in the brake dust collection chamber (44).

12. The brake dust collector as set forth in claim 11, characterized in that the level sensor is an optical sensor.

13. The brake dust collector as set forth in claim 1, characterized in that the brake dust collection chamber (44) comprises a dump valve.

14. The brake dust collector as set forth in claim 1, characterized in that provided on each side of the brake disc (18) upstream of the brake dust intake ports (48) is at least one wiper (4) designed to come into contact with a corresponding side of the brake disc (18).

15. The brake dust collector as set forth in claim 14, characterized in that the wipers (40) are mounted movable axially and come into contact axially with the brake disc (18) when the disc brake (12) is activated.

16. The brake dust collector as set forth in claim 15, characterized in that the wipers (40) are moved to the brake disc (18) hydraulically.

17. A brake dust collector (10) for a disc brake (12) comprising a brake disc (18) and a brake caliper (16) clasping the brake disc, the brake dust collector including a housing (24) designed to clasp a portion of the brake disc (18) directly adjoining the brake caliper (16) in the main direction of rotation (R) of the brake disc (18) and provided with a brake dust retainer arranged in the housing (24), the brake dust retainer comprising a plurality of brake dust intake ports (48), characterized in that the housing (24) features a plurality of air intake ports (34; 38) separate from the brake dust intake ports (48), and in that the housing (24) is configured split to comprise a first housing part (26) for mounting the brake dust collector on the disc brake (12), as well as a second housing part (32) releasably secured to the first housing part (26), and wherein the brake dust retainer features on both sides of the brake disc (18) at least one slat (42, 42') extending radially relative to the brake disc (18) and along the circumference of the brake disc (18), beginning at one of the brake dust intake ports (48) and ending in a brake dust collection chamber (44) and wherein the brake dust collection chamber (44) is provided in the second housing part (32).

18. The brake dust collector as set forth in claim 17, characterized in that the housing (24) is provided on both sides of the brake disc (18) with at least one air intake port (34) arranged upstream of the brake dust intake ports (48) as viewed in the main direction of rotation (R) of the brake disc (18) and in that the air intake ports (34) arranged on both sides of the brake disc (18) are configured on the first housing part (26).

19. A disc brake (12), comprising a brake disc (18) and a brake caliper (16) clasping the brake disc, and characterized by a brake dust collector (10) including a housing (24) designed to clasp a portion of the brake disc (18) directly adjoining the brake caliper (16) in the main direction of rotation (R) of the brake disc (18) and provided with a brake dust retainer arranged in the housing (24), the brake dust retainer comprising a plurality of brake dust intake ports (48), and the housing (24) featuring plurality of air intake ports (34; 38) separate from the brake dust intake ports (48) and characterized in that the brake dust retainer features on each side of the brake disc (18) at least one slat (42, 42') extending radially relative to the brake disc (18) and along the circumference of the brake disc (18), beginning at one of the plurality of brake dust intake ports (48) and ending in a brake dust collection chamber (44).

* * * * *